3,389,799
LUBRICANT RESERVOIR STRUCTURE
WITH VENT MEANS
George E. Thrasher, Jr., Pontiac, Mich., assignor to Master
Pneumatic-Detroit, Inc., Utica, Mich., a corporation of
Michigan
Filed Mar. 14, 1966, Ser. No. 534,160
8 Claims. (Cl. 210—251)

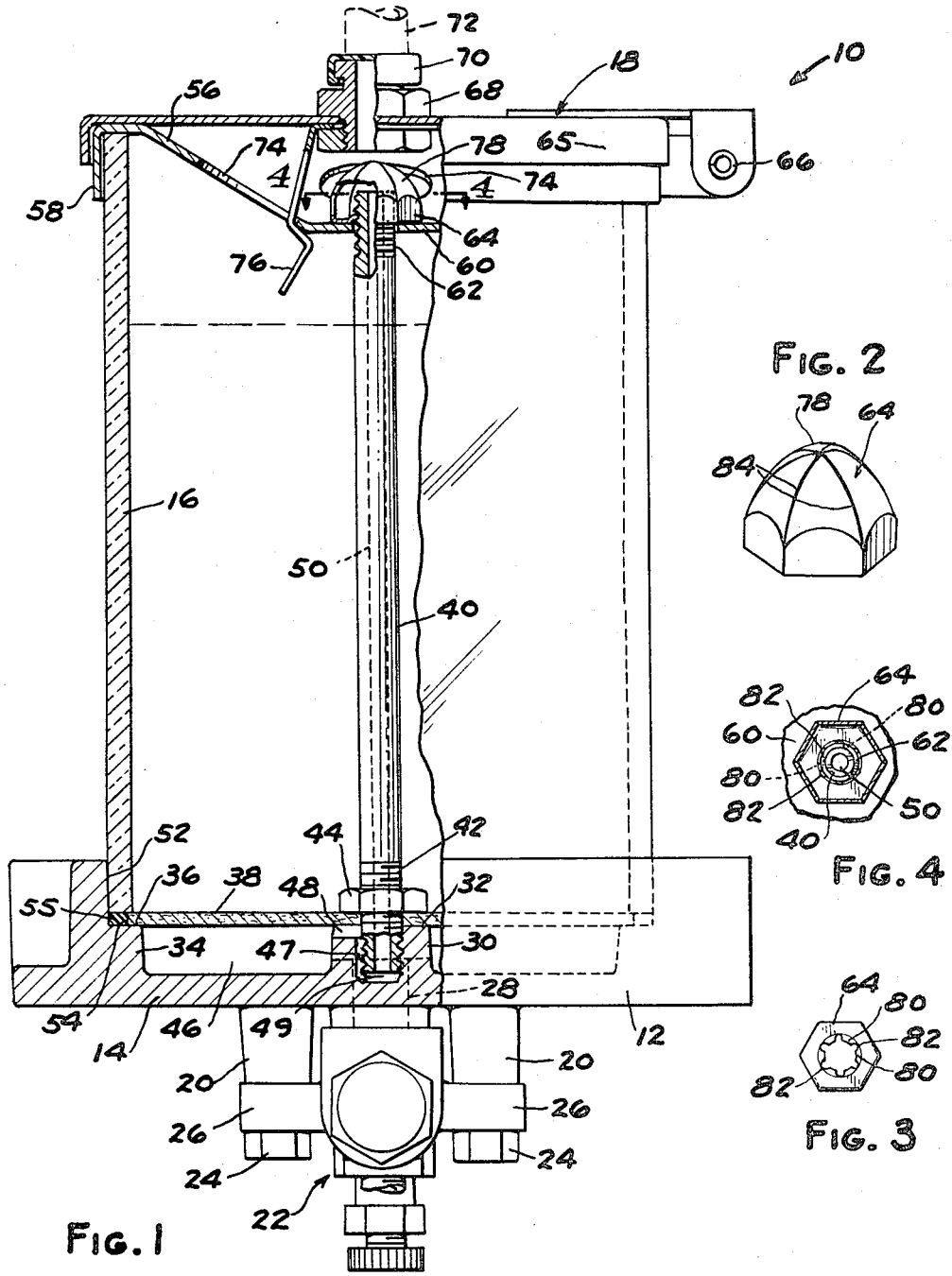
INVENTOR.
GEORGE E. THRASHER, JR.
BY
Barnes, Kisselle, Raisch & Choate
ATTORNEYS United States Patent Office 3,389,799
Patented June 25, 1968

ABSTRACT OF THE DISCLOSURE

A lubricant reservoir structure having a filter element sealed to the side walls thereof, the filter element being spaced from a base element by means of a central boss. A vent tube is provided to vent the space between the filter and base element and is in fluid flow communication with said space through a passageway in the boss. The inlet to the reservoir has an apertured cover member which is held in place by the cooperation of the vent tube and a fastener. The fastener further prevents lubricant from entering the vent tube at the top thereof while at the same time allowing venting from the inside of the tube.

---

This invention relates generally to a lubricant reservoir from which lubricant is furnished to one or more pumps which are required to deliver precise quantities of dirt-free lubricant to equipment to be lubricated. In such a system, it is essential, though difficult, to exclude air bubbles as well as dirt from the lubricant furnished to the pumps.

The general object of the invention is to provide a relatively simple, inexpensive reservoir structure which is improved to deliver thoroughly filtered lubricant in bubble-free condition into the system.

The invention contemplates the use of a filter upstream of the reservoir outlet, the filter having openings so small that they are capillary with respect to the lubricant to be used. The lubricant-saturated filter resists passage of air therethrough and tends to trap air beneath it when the reservoir is first filled. Therefore, a vent tube is provided which extends from beneath the filter to above the lubricant level in the reservoir.

A cover is secured to the upper portion of the reservoir by an acorn nut threaded onto the upper end of the vent tube. The acorn nut not only holds the cover down but its closed end provides a cap which prevents lubricant from entering the upstream end of the vent tube to prevent the vent from becoming blocked. The acorn nut and vent tube have spaced-apart threaded portions which form an opening communicating from the interior to the exterior of the nut through which air from the space below the filter can escape as that space fills with lubricant.

One form of the invention is shown in the accompanying drawings.

FIG. 1 is a side view, partly in plan and partly in section, illustrating a reservoir structure according to this invention.

FIG. 2 is an enlarged perspective view of an acorn nut separate from the other parts.

FIG. 3 is a bottom plan view of the acorn nut.

FIG. 4 is a fragmentary sectional view on line 4—4 of FIG. 1.

Shown in the drawings is a reservoir structure 10 according to this invention having a base 12 providing the bottom wall 14 of the reservoir, an open ended cylinder 16 being mounted on the base and providing the side wall of the reservoir. A cover 18 is provided over the upper end of cylinder 16. Mounting lugs 20 project from the bottom of base 12, and a pump 22 is secured thereto by bolts 24 extending through mounting tabs 26 on the pump body and being threaded into lugs 20. Bottom wall 14 has a lubricant outlet 28 through which lubricant is delivered from the reservoir to pump 22.

Projecting upwardly from bottom wall 14 is a central boss 30 having a top 32 and a peripheral boss 34 terminating at a shoulder 36 on the same level as boss top 32. A filter 38 is centrally supported by boss top 32 and peripherally supported by shoulder 36. A vent tube 40 has a threaded lower end portion 42 for threaded engagement within boss 30. A nut 44 on the tube is threaded into engagement against the top of filter 38 to hold it seated against boss top 32 and shoulder 36. Base 12 and filter 38 define a bottom chamber 46 in the reservoir. Boss 30 is provided with a passageway 47 which places chamber 46 in communication with the vent passageway 50 defined by tube 40. The passageway has an upper portion 48 which opens into chamber 46 and a lower portion 49 beneath the lower end of tube 40.

Filter 38 is formed of a material which has openings so small that they are capillary in nature with respect to lubricant used in the reservoir. A suitable material for the filter is a plate of sintered metal such as sintered bronze.

Base 12 is provided with a wall 52 spaced outwardly from the peripheral edge 54 of filter 38. The lower end portion of cylinder 16 fits within wall 52 and rests upon the top of filter 38 adjacent its peripheral edge, as shown. A seal ring 55 is disposed within the space defined by shoulder 36, wall 52, the bottom edge of cylinder 16, and peripheral edge 54 of the filter, thereby sealing both the edge of the filter and the lower end of cylinder 16 with respect to base 12.

Cover 18 has an inner member 56 provided with a peripheral flange 58 which is hooked downwardly over the top edge of cylinder 16. Inner member 56 has a central web 60 provided with an opening through which the upper threaded end portion 62 of tube 40 projects. An acorn nut 64 is threaded onto the upper end of tube 40 against web 60, thereby clamping cover element 56 against the top of cylinder 16. This clamping force is transmitted to the lower end of the cylinder against seal ring 55, thereby establishing the above-described sealing.

Cover 18 has an upper member 65 hinged to lower member 56 as at 66. Upper cover 65 has a lubricant fitting 68 through which lubricant may be introduced into the reservoir by means of a complementary fitting 70 on a supply line 72. Alternatively, cover 65 may be hinged upwardly and lubricant poured into the reservoir. Cover element 56 is provided with openings 74 for passing lubricant to the reservoir interior. Upper cover 65 is detachably secured in the closed condition illustrated by means of a leaf spring latch 76 engaged within one of the openings 74.

The closed end 78 of the acorn nut provides a cap which excludes lubricant from entering the upper end of vent passageway 50. Means are provided by which air can pass freely from the interior to the exterior of the cap. An effective way to accomplish this is to provide spacing between interengaged portions of the threading on the acorn nut and vent tube. For this purpose, nut 64 may be of the sheet metal type in which the threading comprises inwardly projecting tabs 80 angularly spaced from each other as at 82. Spaces 82 provide the necessary opening between the interior and exterior of the cap.

In a typical sheet metal acorn nut, the dome is formed by bending sheet metal segments into tight engagement with each other, resulting in seams 84 at the junctures of the segments. However, if these seams are so tight that the spaces therebetween, if any, are capillary in nature and no lubricant, or substantially no lubricant, penetrates through the seams. Thus, cap 78 effectively shields passageway 50 despite the presence of such seams.

In use, it may be assumed that reservoir 10 is initially empty and that pump 22 has been mounted thereon as shown. Lubricant is introduced into the reservoir either through fitting 68 or by hinging cover element 65 upwardly as described. Filter 38 immediately becomes saturated with the lubricant; and since the openings therein are of capillary dimension, the saturated filter resists passage of air therethrough. Thus, the saturated filter effectively traps the air in chamber 46. If this air were not vented from the chamber, lubricant delivered through outlet 28 to pump 22 would contain air bubbles, thus interfering with delivery by the pump of an accurately measured quantity of lubricant. As lubricant filters into chamber 46 and the level thereof rises, the trapped air is forced out through passageways 47–50 to the interior of acorn nut 64 and from there to the exterior of the nut through openings 82.

It will be apparent that it is essential to prevent passageways 47–50 from becoming blocked with lubricant while the reservoir is being filled in order to insure the above-described venting action of chamber 46. As described above, the acorn nut provides a cap which is effective for this purpose.

After the reservoir has been filled, lubricant will rise in vent passageway 50 and will follow the level of lubricant within the reservoir. If the lubricant level should fall below vent opening 48, a residual quantity of lubricant will remain in vent passageway portions 47, 49, and 50 which are below opening 48. However, this quantity is so small that when the reservoir is again filled, the resulting pressure head in chamber 46 will cause air trapped beneath filter 38 to bubble past the residual lubricant and vent out through openings 82.

Since filter 38 has openings so small that they are capillary in nature, they filter the lubricant very thoroughly before it reaches outlet 28. Nevertheless, the structure of this invention avoids the tendency of the filter in saturated condition to trap air which might be delivered to the pump.

I claim:
1. Lubricant reservoir structure comprising,
   a container having a base element and a side wall element,
   said side wall element having an inlet for lubricant,
   said base element defining a bottom wall of said container,
   said bottom wall having an outlet for lubricant,
   a filter in said container spaced from said bottom wall and having its edge portions sealed to said container so that substantially all lubricant in said container passes through said filter enroute to said outlet,
   a cover for said inlet apertured to pass lubricant therethrough into said container,
   a vent tube in said container, means securing one end portion of said vent tube to said base element,
   said means defining a passageway which places the interior of said tube in fluid flow communication with the space between said filter and bottom wall,
   said tube having another end portion adjacent said cover and being provided with a fastener, said tube and fastener cooperating to secure said cover in place across said inlet,
   said fastener providing a cap over said other end portion of said tube effective to exclude lubricant from entry into said other end portion,
   said fastener having portions which define a vent passageway from the interior of said tube to the atmosphere.

2. The structure defined in claim 1 wherein said side wall element has one open end which defines said inlet and has another open end engaged against seal means on said base element, said tube, fastener, and cover cooperating to hold said other end of said side wall element in sealed engagement against said seal means.

3. The structure defined in claim 2 wherein said side wall element comprises a hollow cylinder which is open at each of its ends.

4. The structure defined in claim 3 wherein said base element has a cylindrical portion which surrounds said side wall element adjacent said other end thereof, said base element having a shoulder adjoining said cylindrical portion, said filter being supported in spaced relation to said bottom wall by said shoulder, a seal ring being disposed circumferentially around said filter and axially between said shoulder and said other end portion of said side wall element and thereby providing a common seal between said side wall element, base element, and filter.

5. The structure defined in claim 1 wherein said securing means comprises a boss on said bottom wall to which said one end of said tube is threadedly connected, said boss having a passageway which extends from said one end portion of said tube to the space between said bottom wall and filter.

6. The structure defined in claim 5 wherein said boss is hollow and said one end portion of said tube is threaded therein, said passageway having one portion aligned with the tube interior and another portion which extends transversely of the tube to said space.

7. The structure defined in claim 1 wherein the openings in said filter are of capillary dimension relative to lubricant with which said reservoir is adapted to be used.

8. The structure defined in claim 7 wherein said filter comprises a sintered metal plate.

References Cited
UNITED STATES PATENTS

| | | | |
|---|---|---|---|
| 232,072 | 9/1880 | Sassinot | 210—472 X |
| 274,339 | 3/1883 | Kalfus | 210—472 X |
| 285,965 | 10/1883 | Burgess | 210—472 X |
| 1,150,910 | 8/1915 | Warmington | 210—472 |
| 1,986,774 | 1/1935 | Hopfner | 210—451 X |
| 2,256,145 | 9/1941 | Hock | 210—445 |
| 2,526,784 | 10/1950 | Walker | 210—455 X |
| 2,586,226 | 2/1952 | Heldenbrand | 210—453 X |
| 2,745,551 | 5/1956 | Schmid | 210—472 X |

REUBEN FRIEDMAN, *Primary Examiner.*

W. S. BRADBURY, *Assistant Examiner.*